(12) United States Patent
Luo et al.

(10) Patent No.: US 12,535,722 B2
(45) Date of Patent: Jan. 27, 2026

(54) PAN TILT DEVICE WITH DETACHABLE CAMERA

(71) Applicant: Zhongshan Yangguo Electronic Technology CO., Ltd, Zhongshan (CN)

(72) Inventors: Weiqiang Luo, Zhongshan (CN); Xinjun Zou, Zhongshan (CN); Yangjian Wu, Zhongshan (CN)

(73) Assignee: Zhongshan Yangguo Electronic Technology CO., Ltd, Zhongshan (CN)

( * ) Notice: Subject to any disclaimer, the term of this patent is extended or adjusted under 35 U.S.C. 154(b) by 137 days.

(21) Appl. No.: 18/581,705

(22) Filed: Feb. 20, 2024

(65) Prior Publication Data

US 2025/0110392 A1 Apr. 3, 2025

(30) Foreign Application Priority Data

Sep. 28, 2023 (CN) .......................... 202311281570.8

(51) Int. Cl.
*G03B 17/56* (2021.01)

(52) U.S. Cl.
CPC ......... *G03B 17/561* (2013.01); *G03B 17/563* (2013.01); *G03B 17/566* (2013.01)

(58) Field of Classification Search
CPC ... G03B 17/561; G03B 17/563; G03B 17/566
See application file for complete search history.

(56) References Cited

FOREIGN PATENT DOCUMENTS

CN 115530088 A * 12/2022 ........... A01K 15/025

\* cited by examiner

*Primary Examiner* — Minh Q Phan
(74) *Attorney, Agent, or Firm* — JEEN IP LAW, LLC

(57) ABSTRACT

The present disclosure discloses a pan tilt device with a detachable camera. A setting of a positioning clamp connection mechanism between a pan tilt body and a camera body facilitates the camber body to be detachably clamp connected to the pan tilt body when the camera body faces forward and backward. A setting of a proximity switch facilitates a detection of a detachable clamp connection when facing forward and backward and facilitates the pan tilt body to correctly drive the camera body to rotate in a correct direction when tracking and shooting a target object. In addition, based on the positioning clamp connection mechanism, a setting of a first magnetic suction piece of the camera body and a second magnetic suction piece of the pan tilt body is conducive to enhancing a connection force between the pan tile body and the camera body.

7 Claims, 7 Drawing Sheets

PAN TILT DEVICE WITH DETACHABLE CAMERA

CROSS-REFERENCE TO RELATED APPLICATIONS

This application claims priority to Chinese Patent Application No. 202311281570.8, filed on Sep. 28, 2023, which is hereby incorporated by reference in its entirety.

TECHNICAL FIELD

The present disclosure relates to a pan tilt device with a detachable camera.

BACKGROUND

At present, there are some pan tilt devices used to place a mobile phone/camera/fill light. The pan tilt device is provided with a camera, and the pan tilt tracks a target object through the camera. When the camera faces forward and the target object is detected to move left, right, up, or down, in order to track the target object, the pan tilt device needs to drive the corresponding mobile phone/camera/fill light to turn left, right, up or down, when the camera faces backward and the target object is detected to move left, right, up, or down, in order to track the target object, the pan tilt device needs to drive the corresponding mobile phone/camera/fill light and camera to turn right, left, up, or down accordingly. During the above process, the camera itself and/or the pan tilt body cannot determine whether the camera is a forward or backward installation state relative to the pan tilt body through images. Existing technology requires manual setting of whether the current camera is in a forward or backward installation state relative to the pan tilt body. If the setting is incorrect or forgotten, there may be a situation where the pan tilt drives the phone/camera/fill light and camera on it to rotate in a wrong direction, and it is necessary to solve this problem.

SUMMARY

The present disclosure overcomes the shortcomings of the aforementioned technology and provides a pan tilt device with a detachable camera.

To achieve the above objectives, the present disclosure adopts the following technical solutions.

A pan tilt device with a detachable camera, including a pan tilt body, a camera body detachably installed on the pan tilt body, and a camera equipment on the camera body, the camera equipment is configured to shoot; a positioning clamp connection mechanism is provided between the pan tilt body and the camera body so that the camera body is detachably connected to the pan tilt body when facing forward and backward; the pan tile body is provided with a proximity switch for triggering when the camera body is detachably clamp connected to the pan tile body and faces forward, and when the camera body is detachably clamp connected to the pan tile boy and faces backward, or the camera body is provided with a proximity switch for triggering when the camera body is detachably clamp connected to the pan tilt body and faces forward, and when the camera body is detachably clamp connected to the pan tilt body and faces backward; the camera body is provided with a first magnetic suction piece, the pan tile body is provided with a second magnetic suction piece, which is configured to be magnetically attracted to the first magnetic suction piece when the camera body is detachably clamp connected and faces forward and backward.

In an embodiment of the present disclosure, the positioning clamp mechanism includes a first positioning groove and a second positioning groove distributed in a forward and backward at a lower end of the camera body, or the positioning clamp mechanism includes a first positioning groove and a second positioning groove distributed in a left and right at the lower end of the camera body, the positioning clamp mechanism-further includes a positioning protrusion provided on the pan tilt body for the first positioning groove to be positioned when the camera body is detachably connected and faces forward, and for the second positioning groove to be positioned when the camera body is detachably connected and faces backward.

In an embodiment of the present disclosure, the proximity switch is provided in the first positioning groove or in the second positioning groove.

In an embodiment of the present disclosure, the first magnetic suction piece is located between the first positioning groove and the second positioning groove.

In an embodiment of the present disclosure, the pan tilt body is provided with a pan tilt control module, the camera body is provided with a camera control module; when the proximity switch is provided on the pan tilt body, the proximity switch is electrically connected to the pan tilt control module; when the proximity switch is provided on the camera body, the proximity switch is electrically connected to the camera control module, and the pan tilt control module is connected to the camera control module through wireless communication and/or wired communication through a data cable.

In an embodiment of the present disclosure, the pan tilt body includes a handle, the handle is driven by a first motor mechanism and connected to a first arm body that can rotate around a vertical axis, the first arm body is driven by a second motor mechanism and connected to a second arm body that can rotate around a horizontal axis; the second arm body is connected to a clamp component, an upper end of the clamp component is provided with a positioning platform, the positioning clamp mechanism is provided between the positioning platform and the camera body; the first motor mechanism and the second motor mechanism are respectively electrically connected to the pan tilt control module.

In an embodiment of the present disclosure, the clamp component is rotatably connected on the second arm body, and its rotation axis direction is the same as a shooting direction of the camera body.

Compared with prior art, the beneficial effects of the present disclosure are:

1. The pan tilt device of the preset disclosure is simple and easy to implement. A setting of a positioning clamp connection mechanism between the pan tile body and the camera body facilitates the camera body to be detachably clamp connected on the pan tile body when facing forward or backward; the practicality is good. A setting of a proximity switch is convenient for being triggered when the camera body is detachably clamp connected to the pan tilt body and faces forwards and backwards. Therefore, by a specific setting of the proximity switch and whether it is triggered or not, it can be determined whether the camera body is in a forward or backward installation state relative to the pan tile body, which has good practicality, and it facilitates the pan tilt body to correctly drive the camera body to rotate in a correct direction under a condition of understanding an installation state of the camera body when tracking and shooting a target object. In addition, based on the positioning clamp mechanism, a setting of a first magnetic suction piece of the camera body and a second magnetic suction piece of the pan tilt body is conducive to enhancing a connection force between the pan tilt body and the camera body, rendering it difficult for the camera body to detach from the pan tilt body when the pan tilt body is in motion, and has good practicality.

2. A setting of the positioning groove and positioning protrusion of the positioning clamp connection mechanism of the present disclosure is convenient for implementation, while the setting of two positioning grooves and one position protrusion, as shown in FIGS. 4 and 6 or FIGS. 5 and 7, facilitates the positioning groove that is positioning clamp connected with the positioning protrusion is a different groove when the camera body switches between the forward installation state to the backward installation state, and thus a differentiation is formed, it is easy to arrange and trigger the proximity switch in the future, has a good practicality.

3. On the basis of the positioning clamp connection mechanism, a setting of a first magnetic suction piece of the camera body and a second magnetic suction piece of the pan tilt body is conducive to enhancing a connection force between the pan tilt body and the camera body, rendering it difficult for the camera head body to detach from the pan tilt body when the pan tilt body moves, and has good practicality.

4. A setting of a handle, a first motor mechanism, a first arm body, a second motor mechanism, a horizontal axis, a second arm body, and a clamp component of the pan tile body in the present disclosure facilitates an adjustment of orientation by driving the camera body and/or mobile phone/camera on the clamp component to swing left, right, up, and down, which is conducive to tracking the target object and has good practicality.

Figure 1:
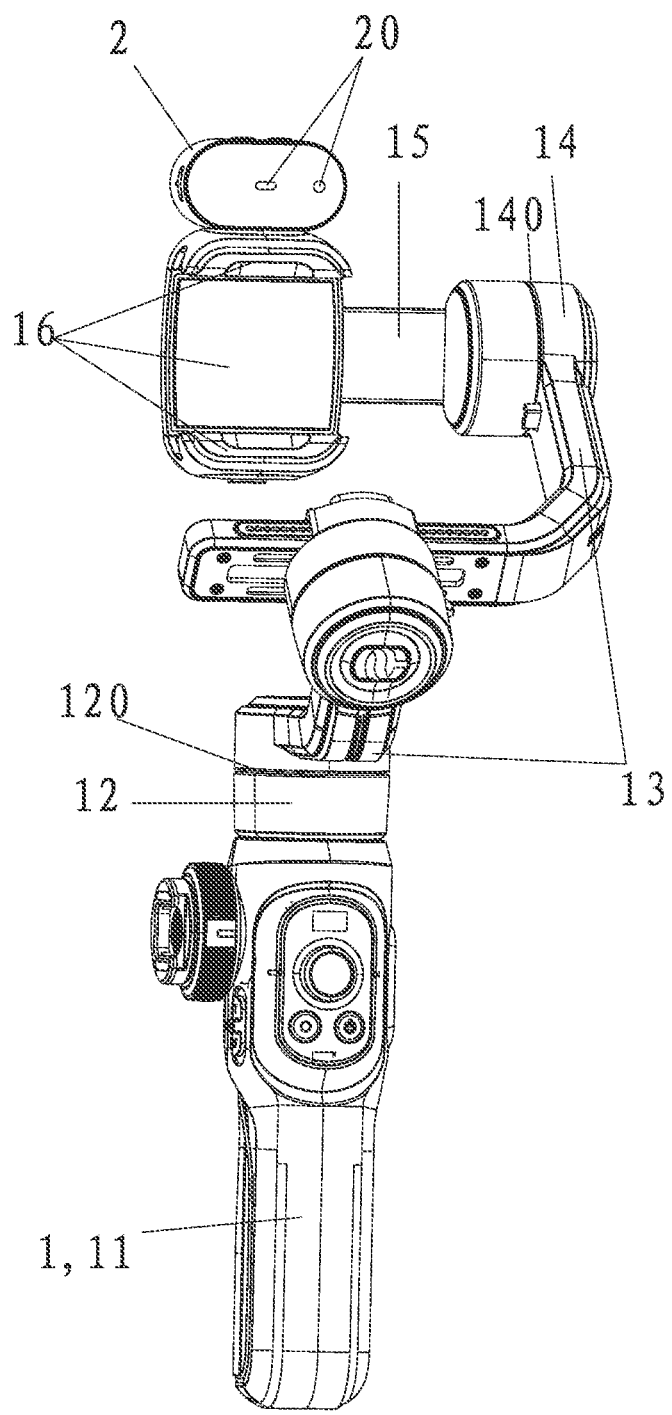
FIG. 1 is a first structural diagram of a pan tilt device of the present disclosure.
Figure 2:
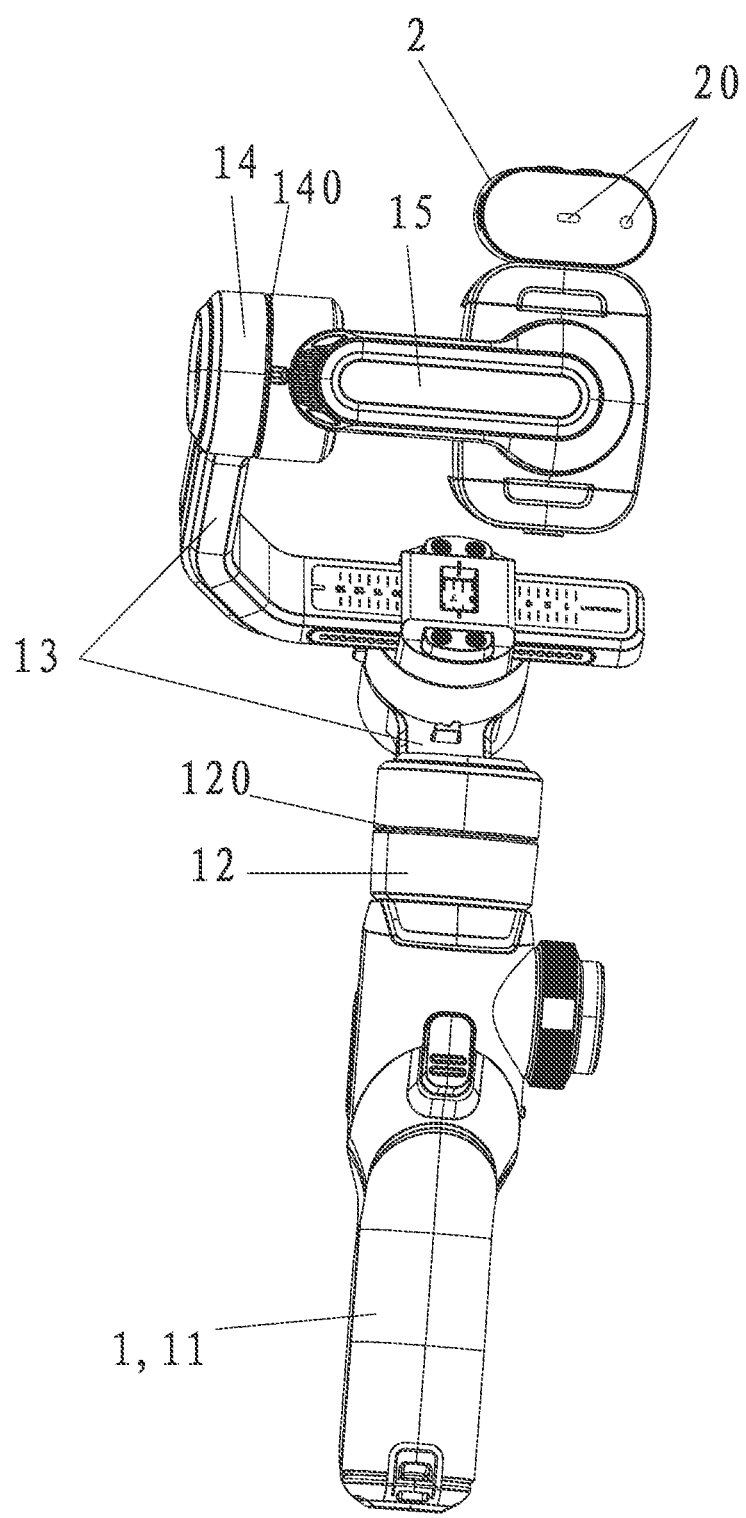
FIG. 2 is a second structural diagram of the pan tilt device of the present disclosure.
Figure 4:
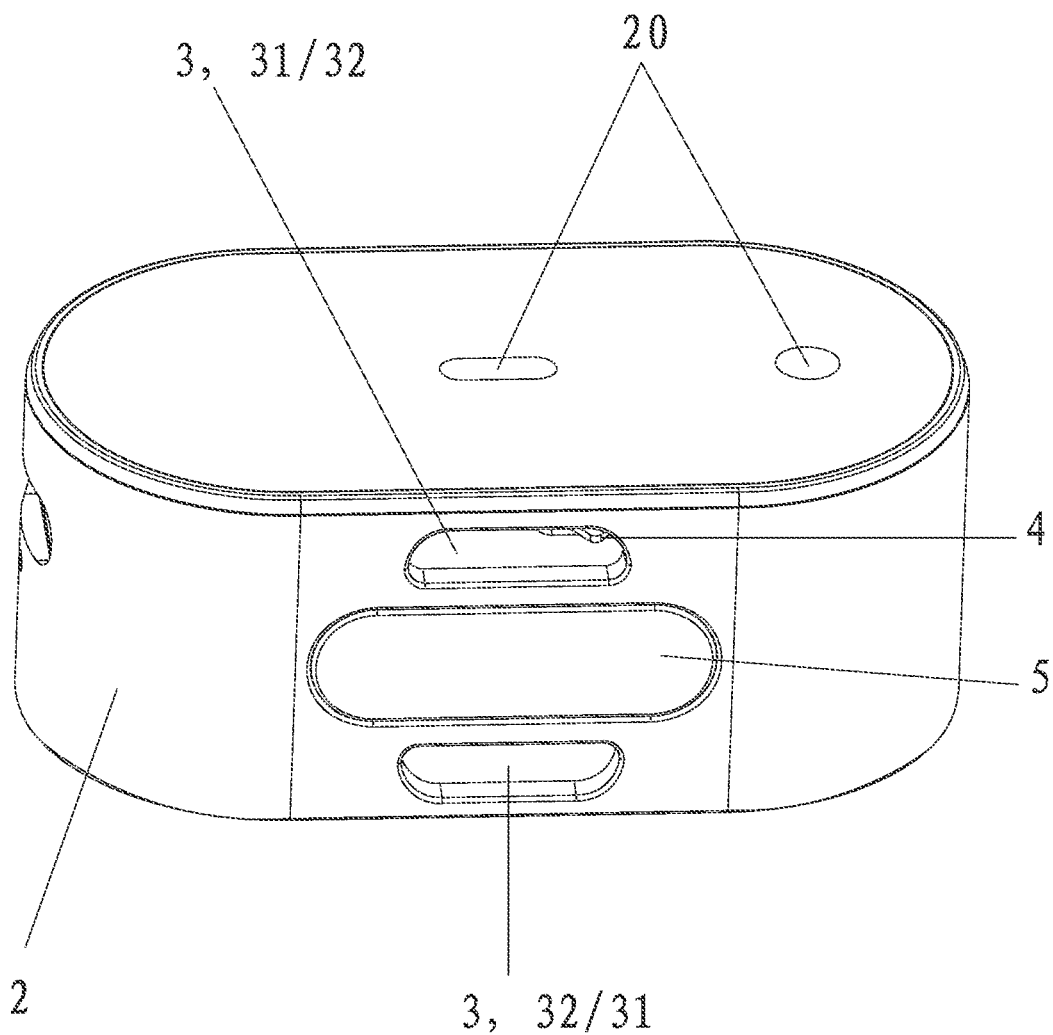
FIG. 4 is a second structural diagram of the camera body of the present disclosure.
Figure 5:
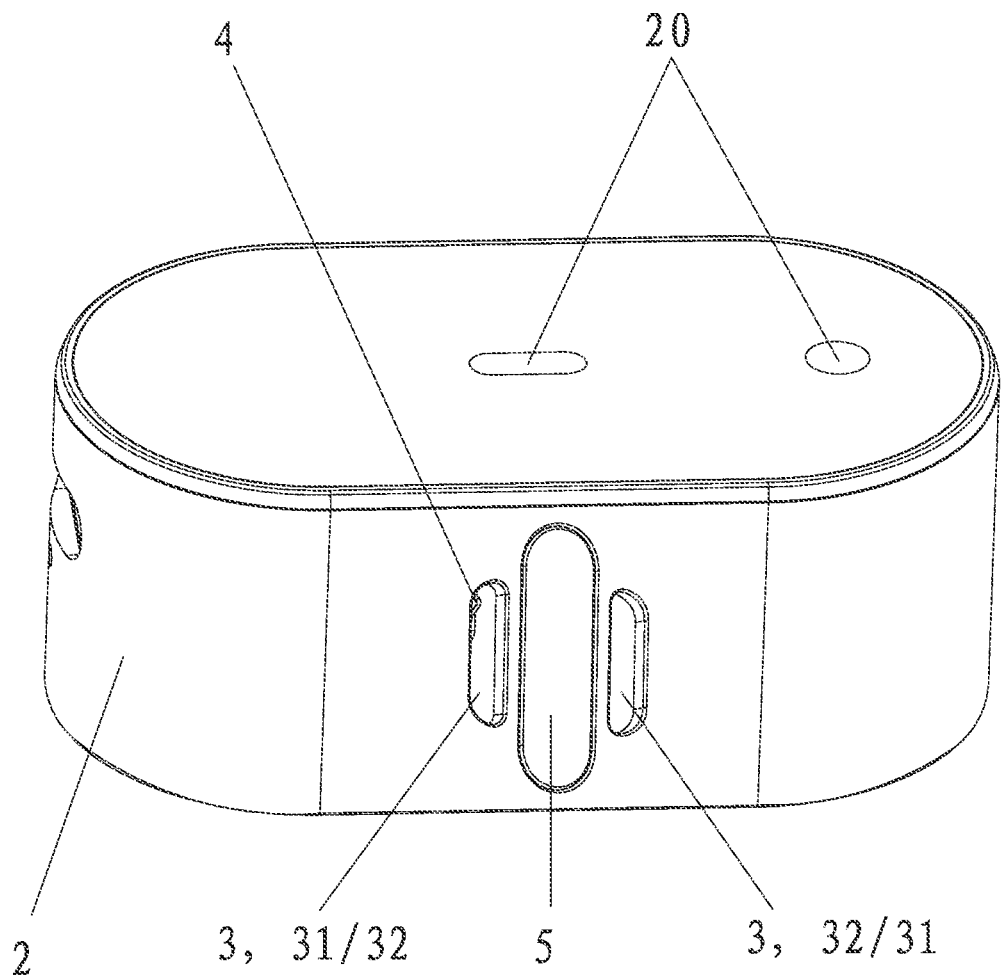
FIG. 5 is a third structural diagram of the camera body of the present disclosure.
Figure 6:
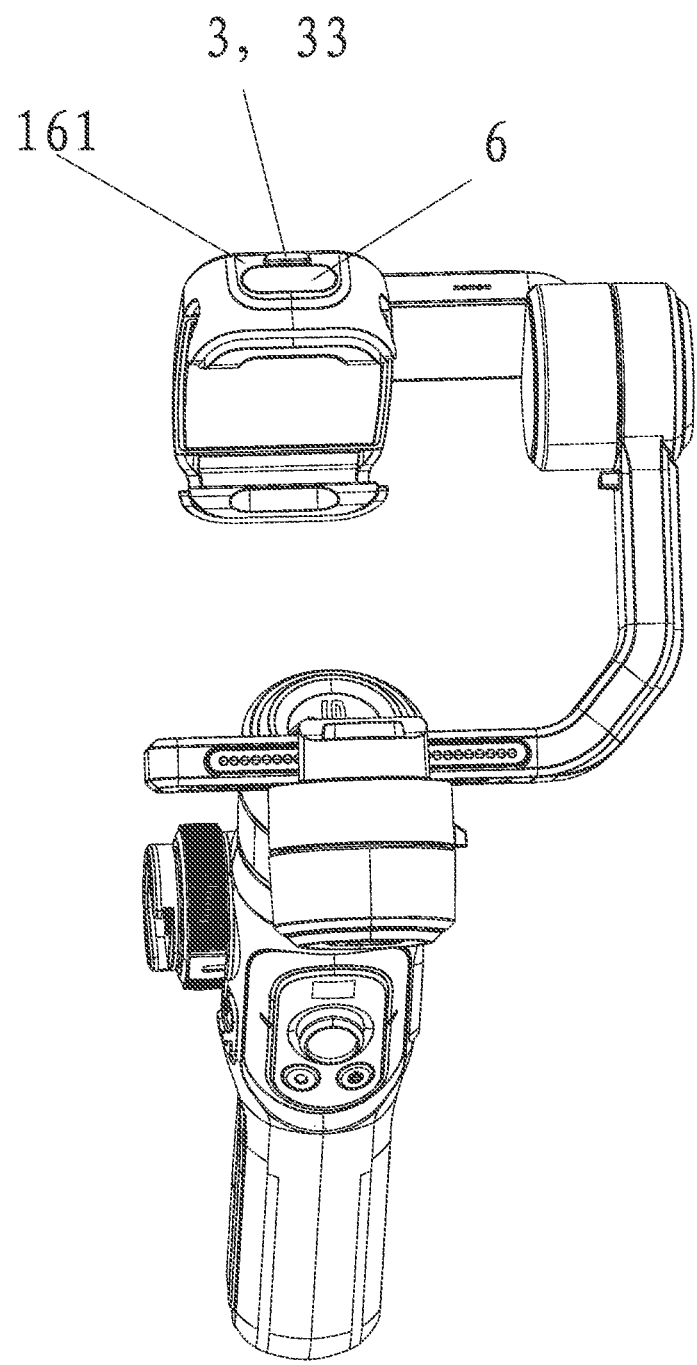
FIG. 6 is a first structural diagram of a pan tile body of the present disclosure.
Figure 7:
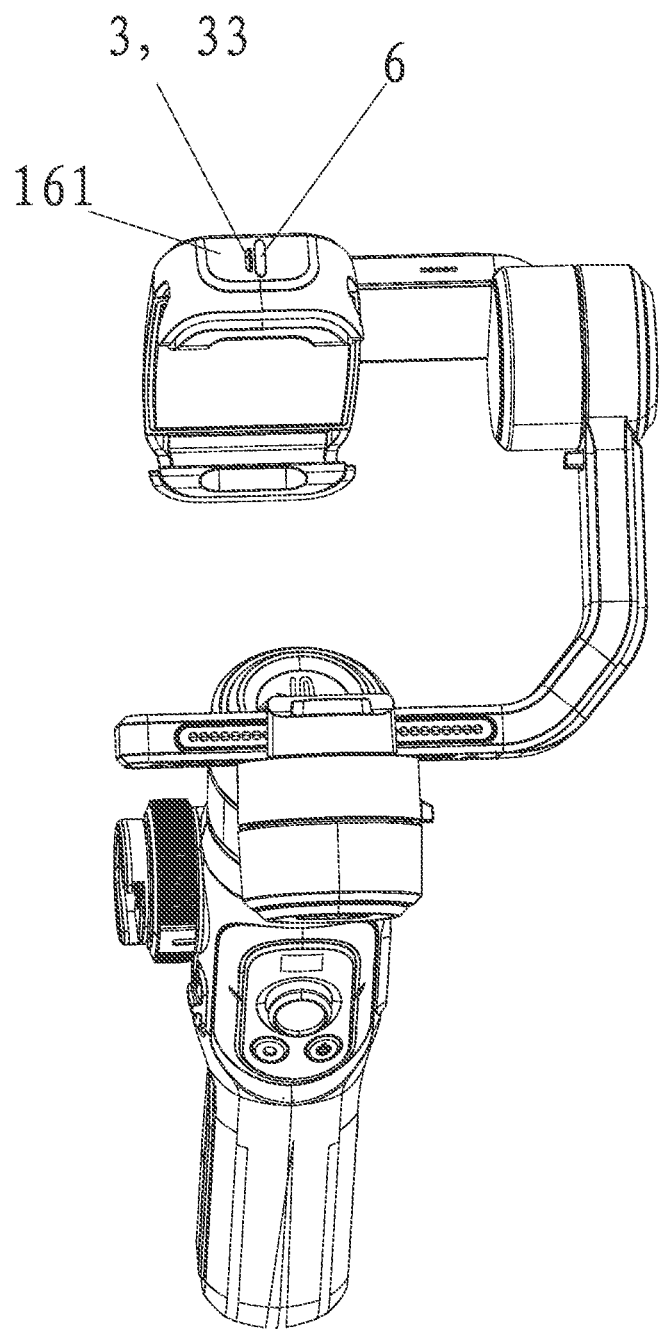
FIG. 7 is a second structural diagram of the pan tile body of the present disclosure.

Where, in FIGS. 1 and 2, directions in which the camera body is installed on the pan tilt body are exactly opposite, with one facing forward and the other facing backward; the camera body shown in FIG. 4 is configured to be positioning clamp connected with the pan tilt body shown in FIG. 6, and the camera body shown in FIG. 5 is configured to be positioning clamp connected with the pan tilt body shown in FIG. 7.

DESCRIPTION OF EMBODIMENTS

The following provides further a detailed explanation of features of the present disclosure and other related features through embodiments, in order to facilitate the understanding of technical personnel in the same industry.

As shown in FIGS. 1 to 7, a pan tilt device with a detachable camera includes a pan tilt body 1, a detachable camera body 2 installed on the pan tilt body 1, and a camera equipment 20 for shooting outward on the camera body 2. A positioning clamp mechanism 3 is provided between the pan tilt body 1 and the camera body 2 so that the camera body 2 is detachably connected to the pan tilt body 1 when facing forward and backward. The pan tilt body 1 is provided with a proximity switch 4 for triggering when the camera body 2 is detachably clamp connected to the pan tilt body 1 in a forward direction or when the camera body 2 is detachably clamp connected to the pan tilt body 1 in a backward direction, in an implementation mode, the camera body 2 is provided with a proximity switch 4 for triggering when the camera body 2 is detachably clamp connected to the pan tilt body 1 in the forward direction or when the camera body 2 is detachably clamp connected to the pan tilt body 1 in the backward direction. The camera body 2 is provided with a first magnetic suction piece 5, the pan tilt body 1 is provided with a second magnetic suction piece 6 which is configured to be magnetically attracted to the first magnetic suction piece 5 when the camera body 2 is detachably clamp connected and faces forward and backward.

As mentioned above, the structure of the pan tilt body of the present disclosure is simple and easy to implement. A setting of the positioning clamp connection mechanism 3 between the pan tilt body 1 and the camera body 2 facilitates a detachable clamp connection of the camera body 2 to the pan tilt body 1 in the forward direction and in the backward direction, which is practical. A setting of the proximity switch 4 is also convenient for triggering when the camera body 2 is detachably clamp connected to the pan tilt body 1 and faces forward or backward. Therefore, by a specific setting of the proximity switch 4 and whether it is triggered or not, it can be determined whether the camera body 2 is in a forward installation state or a backward installation state relative to the camera body 2, which has good practicality. When tracking and shooting a target object, the pan tilt body 1 can correctly drive the camera body 2 to rotate in a correct direction while understanding the installation state of the camera body 2. Furthermore, on the basis of the positioning clamp connection mechanism 3, the setting of the first magnetic suction piece 5 of the camera body 2 and the second magnetic suction piece 6 of the pan tilt body 1 is conducive to enhancing a connection force between the pan tilt body 1 and the camera body 2, rendering it difficult for the camera body 2 to detach from the pan tilt body 1 when the pan tilt body 1 moves, and has good practicality.

Figure 3:
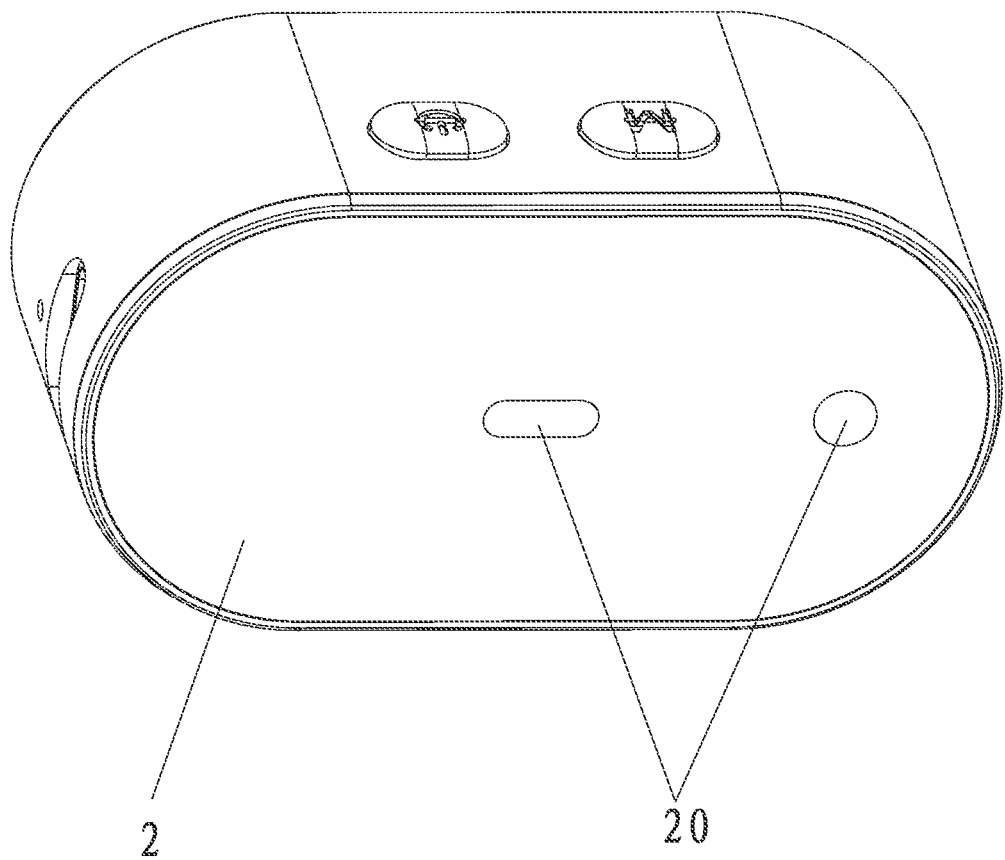
FIG. 3 is a first structural diagram of a camera body of the present disclosure.

As described above, in a specific implementation, as shown in FIGS. 3 and 4, the positioning clamp mechanism 3 includes a first positioning groove 31 and a second positioning groove 32 distributed in a forward and backward at a lower end of the camera body 2, or as shown in FIGS. 3 and 5, the positioning clamp mechanism 3 includes a first positioning groove 31 and a second positioning groove 32 distributed in a left and right at a lower end of the camera body 2, as shown in FIGS. 6 and 7, the positioning clamp connection mechanism 3 further includes a positioning protrusion 33 provided on the pan tilt body 1 for the first positioning groove 31 to be connected when the camera body 2 is detachably connected and faces forward, and for the second positioning groove 32 to be connected when the camera body 2 is detachably connected and faces backward.

As mentioned above, a setting of the positioning groove and positioning protrusion of the positioning clamp connection mechanism 3 in the present disclosure is convenient for implementation, while the setting of two positioning grooves and one position protrusion, as shown in FIGS. 4 and 6 or as shown in FIGS. 5 and 7, facilitates the positioning groove that is positioning clamp connected with the positioning protrusion is a different groove when the camera body switches between the forward installation state to the backward installation state, and thus a differentiation is formed, it is convenient for a subsequent setting and triggering of a proximity switch 4, has a good practicality.

As shown in FIGS. 4 and 5, in a specific implementation, the proximity switch 4 is provided in the first positioning groove 31 or in the second positioning groove 32, so that the proximity switch 4 is triggered when the camera body 2 is forward installation or backward installation.

As shown in FIGS. 4 and 6, or as shown in FIGS. 5 and 7, during a specific implementation, the first magnetic suction piece 5 is located between the first positioning groove 31 and the second positioning groove 32. Therefore, after horizontally rotating the camera body 2 in 180 degrees, the first magnetic suction piece 5 is still located between the first positioning groove 31 and the second positioning groove 32, which facilitates the setting of the second magnetic suction piece 6 at a corresponding position on the pan tilt body 1 for magnetic suction.

As mentioned above, in a specific implementation, the pan tilt body 1 is provided with a pan tilt control module, the camera body 2 is provided with a camera control module. When the proximity switch 4 is provided on the pan tilt body 1, the proximity switch 4 is electrically connected to the pan tilt control module. When the proximity switch 4 is provided on the camera body 2, the proximity switch 4 is electrically connected to the camera control module, the pan tilt control module and the camera control module are connected through wireless communication and/or wired communication via a data cable.

As shown in FIGS. 1 and 2, during a specific implementation, the pan tilt body 1 includes a handle 11, the handle 11 is driven by a first motor mechanism 12 and connected to a first arm body 13 that can rotate around a vertical axis 120. The first arm body 13 is driven by a second motor mechanism 14 and connected to a second arm body 15 that can rotate around a horizontal axis 140. The second arm body 15 is connected to a clamp component 16, an upper end of the clamp component 16 is provided with a positioning platform 161, the positioning clamp connection mechanism 3 is provided between the positioning platform 161 and the camera body 2; the first motor mechanism 12 and the second motor mechanism 14 are respectively electrically connected to the pan tilt control module.

As mentioned above, a setting of the handle 11, first motor mechanism 12, first arm body 13, second motor mechanism 14, horizontal axis 140, second arm body 15, and clamp component 16 of the pan tilt body 1 of the present disclosure facilitates an adjustment of orientation by driving the camera body 2 on the clamping component 16 and/or the phone/camera to swing left, right, up, and down, which is conducive to tracking the target object and has good practicality.

As shown in FIGS. 1 and 2, the clamp component 16 is rotatably connected on the second arm body 15, and its rotation axis direction is the same as a shooting direction of the camera body 2. In a specific implementation, it can be used to manually rotate and fine tune a swing angle of the camera body 2 relative to the clamp component 16.

As mentioned above, the present disclosure seeks to protect a pan tilt device with a detachable camera, and all technical solutions that are the same or similar to the present disclosure should be falling within the protection scope of the present disclosure.

What is claimed is:

1. A pan tilt device with a detachable camera, comprising a pan tilt body, a camera body detachably installed on the pan tilt body, and a camera equipment on the camera body, the camera equipment is configured to shoot;
   wherein a positioning clamp connection mechanism is provided between the pan tilt body and the camera body, and the camera body is detachably connected to the pan tilt body;
   the pan tilt body is provided with a proximity switch for triggering when the camera body is detachably clamp connected to the pan tilt body and faces forward, and when the camera body is detachably clamp connected to the pan tilt body and faces backward, or the camera body is provided with the proximity switch for triggering when the camera body is detachably clamp connected to the pan tilt body and faces forward, and when the camera body is detachably clamp connected to the pan tilt body and faces backward;
   wherein the camera body is further provided with a first magnetic suction piece, the pan tilt body is provided with a second magnetic suction piece, which is configured to be magnetically attracted to the first magnetic suction piece when the camera body is detachably clamp connected and faces forward and backward.

2. The pan tilt device with a detachable camera according to claim 1, wherein the positioning clamp mechanism comprises a first positioning groove and a second positioning groove distributed in a forward and backward at a lower end of the camera body, or the positioning clamp mechanism comprises a first positioning groove and a second positioning groove distributed in a left and right at the lower end of the camera body,
   the positioning clamp mechanism further comprises a positioning protrusion provided on the pan tilt body for the first positioning groove to be positioned when the camera body is detachably connected and faces forward, and for the second positioning groove to be positioned when the camera body is detachably connected and faces backward.

3. The pan tilt device with a detachable camera according to claim 2, wherein the proximity switch is provided in the first positioning groove or in the second positioning groove.

4. The pan tilt device with a detachable camera according to claim 2, wherein the first magnetic suction piece is located between the first positioning groove and the second positioning groove.

5. The pan tilt device with a detachable camera according to claim 1, wherein the pan tilt body is provided with a pan tilt control module, the camera body is provided with a camera control module;
   when the proximity switch is provided on the pan tilt body, the proximity switch is electrically connected to the pan tilt control module; when the proximity switch is provided on the camera body, the proximity switch is electrically connected to the camera control module, and the pan tilt control module is connected to the camera control module through wireless communication and/or wired communication through a data cable.

6. The pan tilt device with a detachable camera according to claim 5, wherein the pan tilt body comprises a handle, the handle is driven by a first motor mechanism and connected to a first arm body that can rotate around a vertical axis, the first arm body is driven by a second motor mechanism and connected to a second arm body that can rotate around a horizontal axis;

the second arm body is connected to a clamp component, an upper end of the clamp component is provided with a positioning platform, the positioning clamp mechanism is provided between the positioning platform and the camera body;

the first motor mechanism and the second motor mechanism are respectively electrically connected to the pan tilt control module.

7. The pan tilt device with a detachable camera according to claim 6, wherein the clamp component is rotatably connected on the second arm body, and its rotation axis direction is the same as a shooting direction of the camera body.

\* \* \* \* \*